Nov. 7, 1950 J. CHENOUARD 2,528,485
FILING DEVICE
Filed Jan. 8, 1948 3 Sheets-Sheet 1
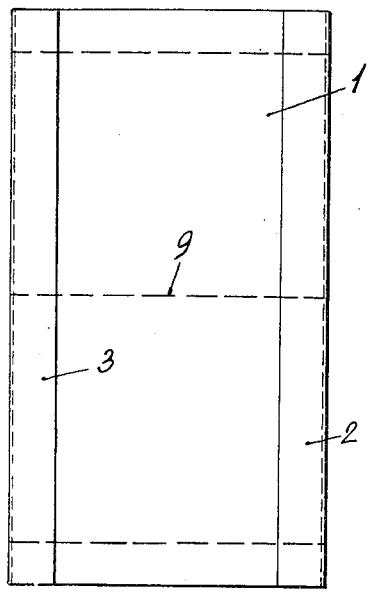
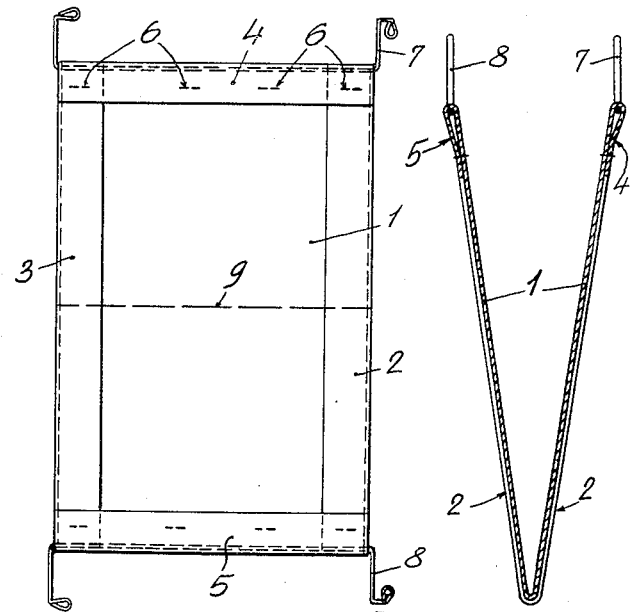
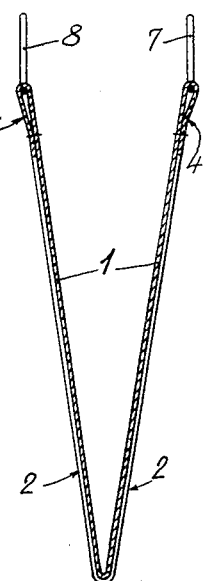
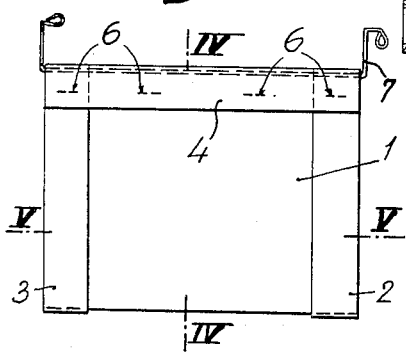
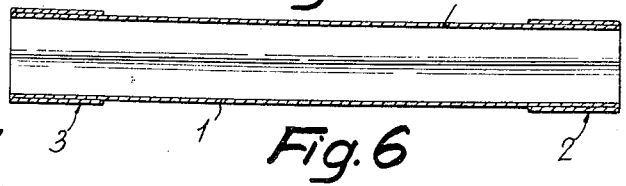
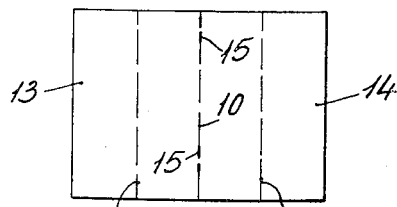
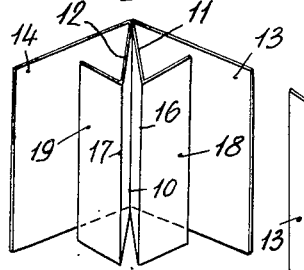
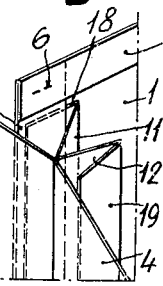
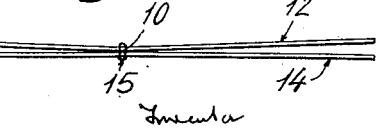

Nov. 7, 1950 J. CHENOUARD 2,528,485
FILING DEVICE
Filed Jan. 8, 1948 3 Sheets-Sheet 2

Inventor
Joseph Chenouard
by Michael S. Hunt

Nov. 7, 1950 J. CHENOUARD 2,528,485
FILING DEVICE
Filed Jan. 8, 1948 3 Sheets-Sheet 3

Patented Nov. 7, 1950

2,528,485

UNITED STATES PATENT OFFICE 2,528,485

FILING DEVICE

Joseph Chenouard, Paris, France

Application January 8, 1948, Serial No. 1,231
In France February 28, 1947

10 Claims. (Cl. 129—16.7)

The object of the invention is a filing device for use in suspended vertical filing systems, where each folder is laterally accessible. Its essential characteristic consists in that the records or documents are accommodated within hanging folders, opened laterally and provided on their outer surface along their front edge or margin with a pocket-like fold adapted to receive a corresponding flap of a separate connecting guide slip which also comprises two leaves respectively engaged within two hanging folders adjacent to one another.

The lateral pocket-like fold of the hanging folder, further to being used for anchoring the connecting guide slip, is advantageous in that it will reinforce the corresponding edge of the said hanging folder. The rear edge and upper edges may also be reinforced in a similar manner.

The hanging folders and the connecting guide slips may be made of any suitable material in leaf form, such as paper, cardboard, cellulose or plastic materials, transparent or not, and may also be made of several materials diversely arranged; these parts or some portions thereof could even be made of thin sheets of metal, for instance, a light metal such as aluminium or aluminium alloy.

The fold or folds in the hanging folders may be fastened by any suitable means, for instance, by way of metal clips, which can be readily applied and will permit to manufacture the said hanging folders by very simple operations. Likewise, the several leaves of the connecting guide slips may be connected by any suitable means, and particularly by metal clips. However, some of these leaves may be obtained by folding a suitable sheet.

The connecting guide slips may either be simple, i. e., not projecting beyond the front edges of the hanging folders, or have forwardly projecting indexing extensions, which may be provided, for instance, with title-holders. The connecting guide slips may extend along the total height of the hanging folders or only along a portion thereof. In cases where indexing extensions are provided, the height thereof may be equal to that of the main body of the connecting guide slip or, alternatively, be different. The indexing extension height may be one half, one third, one fourth, one fifth, etc. of the height of the hanging folders, and the said indexing extensions may be positioned at various heights upon the several hanging folders so as to provide particular indexing means therefor.

The invention will be described in more detail hereafter with reference to the accompanying drawings which show some embodiments of the invention, and in which:

Fig. 1 is a view of a hanging folder according to the invention, shown in the process of manufacture;

Fig. 2 is a view of the finished hanging folder in the open position;

Fig. 3 is a corresponding view of the hanging folder folded in operative position—

Fig. 4 is a sectional view taken along line IV—IV of Figure 3;

Figure 16:
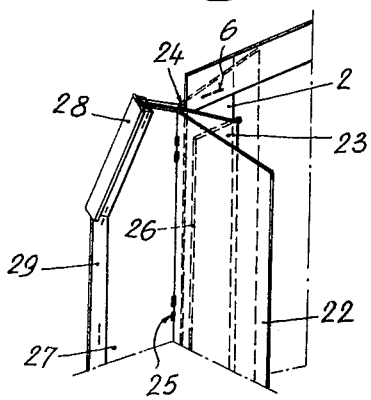
Figure 17:
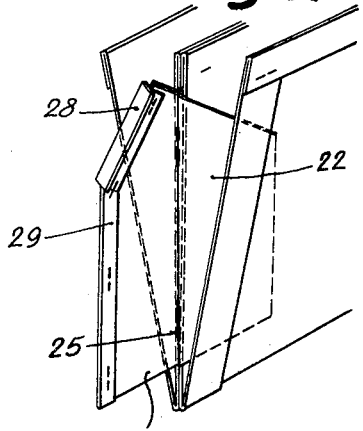
Figure 18:
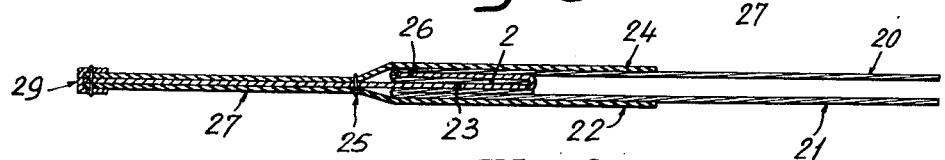
Figure 20:
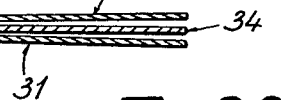
Figure 19:
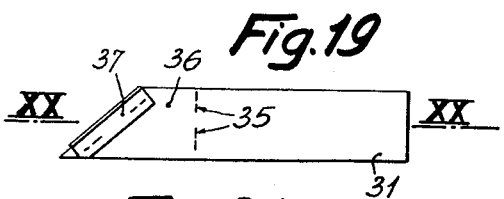
Figure 21:
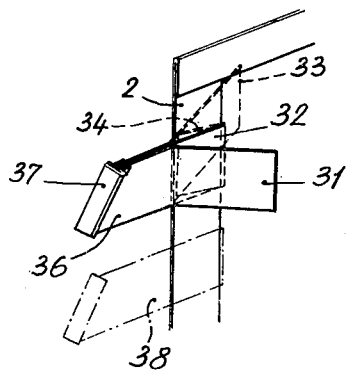
Figure 10:
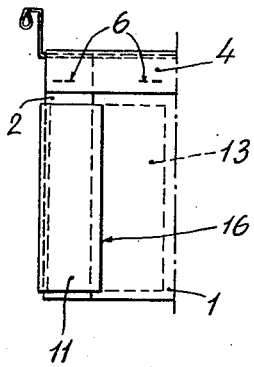
Figure 12:
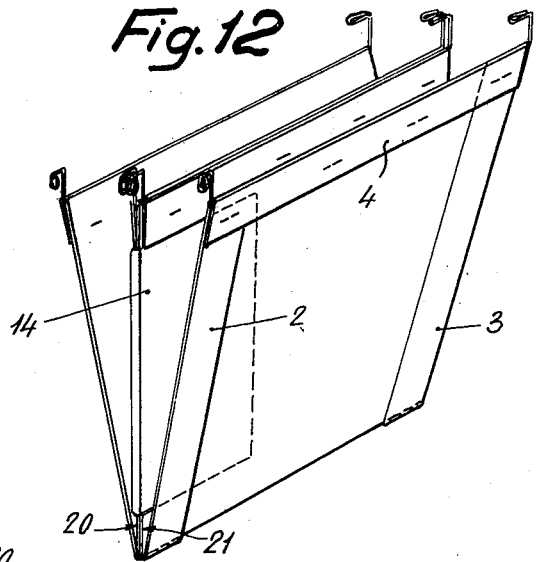
Figure 11:
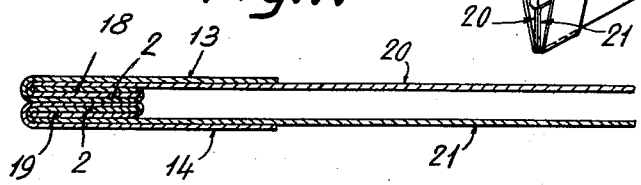
Figure 14:
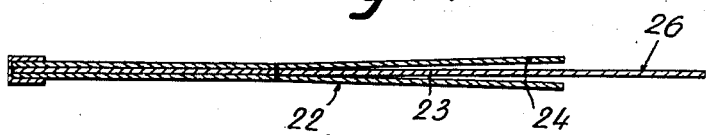
Figure 15:
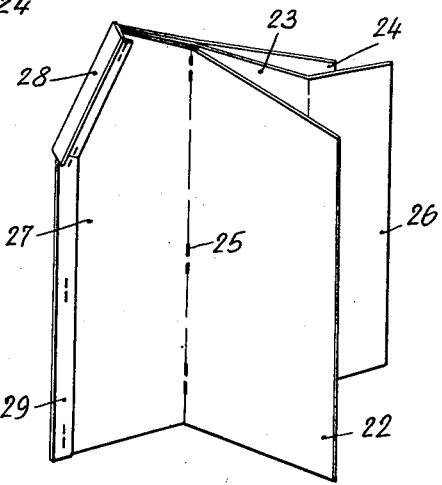
Figure 13:
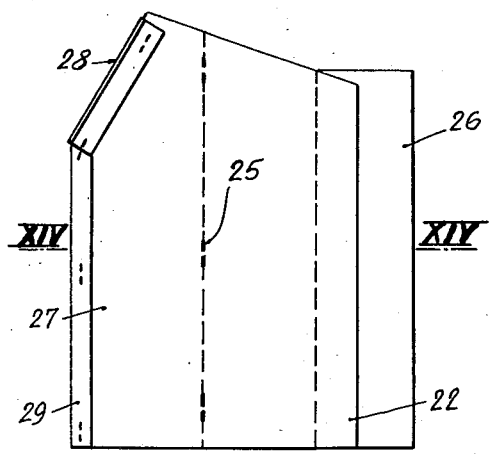

Fig. 5. is a sectional view taken along line V—V of Figure 3;

Fig. 6 is an elevational view of one embodiment of a connecting guide slip;

Fig. 7 is a plan view corresponding to Figure 6;

Fig. 8 is a perspective view of the connecting guide slip showing the flap portion used for engagement;

Fig. 9 is a perspective view showing the engagement of the connecting guide slip within a pocket-like fold of a hanging folder;

Fig. 10 is a corresponding elevational view of one half of the connecting guide slip;

Fig. 11 is a transverse sectional view of the connecting guide slip and of the portions of the hanging folder adapted for engagement therewith, all parts being in operative position;

Fig. 12 is a corresponding perspective view, showing two hanging folders in closely spaced relation connected by means of the connecting guide slip;

Fig. 13 shows an elevational view of a modification of a connecting guide slip;

Fig. 14 is a sectional view on lines XIV—XIV of Fig. 13;

Fig. 15 is a corresponding prespective view;

Fig. 16 shows the engagement of this connecting guide slip with a hanging folder;

Fig. 17 is a perspective view of the connecting guide slip in operative position;

Fig. 18 is a corresponding transverse sectional view;

Fig. 19 shows another modification of a connecting guide slip;

Fig. 20 is a corresponding transverse sectional view taken along line XX—XX of Figure 19;

Fig. 21 shows the engagement of this connecting guide slip; and

Figure 22:
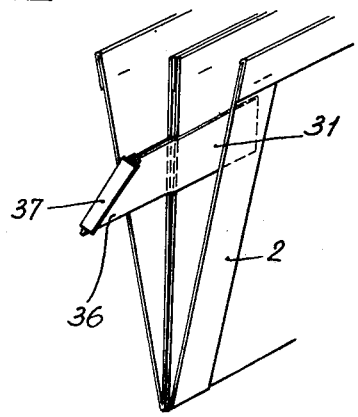

Fig. 22 shows this connecting guide slip in operative position.

One embodiment of the hanging folder illustrated in Figs. 1 to 4 consists of a sheet 1 of paper, cardboard or any other compartively flexible material, the longitudinal marginal edges of which have been folded over to the same side of sheet 1 (Fig. 1); furthermore, the end or transverse edges are thereafter likewise folded over to the same side, the folds being fastened by any suitable means, for instance by way of metal clips, such as 6. Into the transverse folded portions 4—5 are inserted suspending wires 7—8, having curved ends so as to permit the engagement thereof with the permanent supports adapted to receive these folders. The hanging folder is thereafter folded over along its transverse center line 9 in such a way that the folds 2—3—4—5 are positioned outside (Figs. 3-4); the folded portions 2—3—4—5 ensure a marginal strengthening of the hanging folder and either of the folds 2 or 3, the one which will be positioned on the lateral front marginal edge of the hanging folder, say for instance fold 2, will be used for engagement of the connecting guide slip, as will be explained below. Obviously, some of the other marginal folded-over portions 3—4—5, and even any other folded portions which are not used in connection with the engagement of the connecting guide slip, might be eliminated without exceeding the scope of the invention.

In the embodiment represented in Figs. 6 to 12, the connecting guide slip comprises four superposed leaves 11—12—13—14 obtained by folding, along the line 10, the two sheets 11—12 and 13—14 which are clipped together, as at 15 on the line 10.

After folding along line 10, both inner leaves 11—12 are again folded towards the outside along lines 16—17, respectively, so as to form flap members 18—19 designed for engagement within the pockets 2 of the hanging folders. Fig. 9 shows the engagement of the flap portion 18 with a pocket 2. The corresponding outer leaf 13 of the connecting guide slip is designed to be engaged against the inner surface of the side of the hanging folder which has its outer surface in engagement with the flap portion 18 (Figs. 9–10). Likewise, the flap 19 will be inserted into the pocket 2 of the adjoining side of the adjacent hanging folder, and the leaf 14 will be engaged inside the latter in such a way that when in operative position the connecting guide slip is arranged as shown in Fig. 11 wherein the two adjoining sides of two adjacent hanging folders have been indicated by numerals 20 and 21. It is seen that this connecting guide slip is in engagement with both outer pockets of the hanging folders 20—21 by means of the flaps 18—19, whereas the leaves 13—14 are engaged inside the hanging folders 20—21 respectively, thereby connecting the said folders 20—21 as shown in Figure 12, and furthermore the connecting guide slip will prevent insertion of documents between these two folders.

It may be seen that the connecting guide slip according to the invention is readily removable due to its being in engagement with the hanging folders only by means of suitable flaps, thus permitting it to be inserted after the hanging folders have been placed in proper positions. It is also possible to substitute connecting guide slips of a given type in lieu of slips of another kind, according to filing requirements, without having to remove the hanging folders.

In the embodiment shown by way of example in Figs. 13 to 18, similar hanging folders are being used but the connecting guide slip is of the type provided with title-holders. This means that it has an extension projecting in front of the folders, and this extension may be provided with a casing or index slip carrier adapted to receive a suitable index slip.

In this embodiment, the connecting guide slip includes only three superposed leaves 22—23—24, connected together for instance by means of clips, such as 25, and arranged on a line which corresponds to the inner margins of the hanging folders; two of the leaves 22—23—24 may be made of the same sheet or leaf suitably folded. The intermediate leaf 23 has a flap portion 26 which is folded over in working position between the main portion of the leaf 23 and one of the outer leaves 22—24; this flap 26 is engaged within a pocket 2 of the hanging folder. Figures 13—14 show the flap 26 before folding, while Fig. 15 shows the flap 26 in a position in which the folding operation has been started, and Fig. 16 shows the same flap 26 in engagement with a pocket 2 of the hanging folders.

The forwardly projecting extension of the connecting guide slip has been indicated by 27. This extension may comprise an inclined upper margin which receives a casing 28, for instance, of transparent material and adapted for reception of an index slip of any kind which will permit to identify the records accommodated within the adjacent hanging folder. Furthermore, the forward or front margin of the extension 27 may be provided with a tab 29 which will be arranged over the superposed layers of this extension thus contributing to the strengthening thereof; this tab may be secured by any suitable means, for instance by clips.

In operative position (Figs. 17 and 18), the outer leaves 22—24 of a connecting guide slip are engaged within two adjacent hanging folders 20—21, whereas the flap 26 of the intermediate leaflet 23 is engaged within the pocket 2 of one of the two sides of the hanging folders 20—21. The said connecting guide slip ensures the connection of the two hanging folders 20—21 in similar conditions to the connecting guide slip of Fig. 12, except that the slip is anchored to only one of the two folders and that it is provided with a forwardly projecting extension forming a title-carrier, or title-holder.

In the embodiment shown by way of example in Figs. 19 to 22, the connecting guide slip comprises three superposed leaves similar to the connecting guide slip of Figs. 13 to 18, and these three leaves have been indicated by numerals 31—32—33; the intermediate leaf 32 is provided with a flap portion 34 for engagement with a pocket 2 of the hanging folders. The three leaves are connected together by clips, such as 35, along a line corresponding to the inner margin of the hanging folder, while the portion 36, positioned forwardly of such line, forms a title-carrier extension which may receive upon an inclined inner margin a casing 37 of transparent material for insertion of a suitable index slip. Whereas the connecting guide slip of Figs. 13 to 18 extends approximately along the total height of the hanging folders, the connecting guide slip of Figs. 19 to 22 extends only along a fraction of this height and may be positioned at various heights so as to form a step arrangement for indexing of the hanging folders. Thus, in Fig. 21 is shown by the dotted lines 38 a second position of the connecting guide slip which is shifted or offset relative to the position of the connecting guide slip shown in full lines. It will be understood that some connecting guide slips may be positioned at a given height, while other connecting guide slips will be arranged at various heights.

When several adjacent hanging folders are designed to accommodate similar documents, only one connecting guide slip with title-carrier may be used at one end of the series of folders, while the intermediate connecting guide slips will be simple, i. e., without forwardly projecting extension, the title-carrier guide slip thus acting as a front rank sign for a plurality of hanging folders. Other arrangements may also be considered which would use connecting guide slips of a certain type for some hanging folders and guide slips of another type for other folders.

The invention is particularly adaptable to any useful arrangement, as the connecting guide slips are removable and the positioning thereof may consequently be varied according to requirements. Thus, when a plurality of hanging folders all identical are set in proper position, it will be possible whenever required to provide such folders with varied connecting guide slips. The mounting of such guide slips will be very simple, since it will be sufficient to have them prepared separately from the hanging folders and then engaged therewith without removing the folders from the filing-cabinet in which they are accommodated.

Should the connecting guide slips have to stay permanently on the hanging folders after having been mounted thereon, said guide slips might be secured to the folders by any suitable means, for instance by gluing.

It will be understood that the embodiments hereinbefore described and illustrated in the accompanying drawing are not of a limitative character and that various modified constructional forms might be contemplated without exceeding the scope of the invention.

What I claim is:

1. A filing device for use in connection with vertical filing systems, comprising a series of hanging folders positioned side by side adapted for lateral access of documents inserted therein, each hanging folder having sides and at least on the outer surface of one of said sides a folded-over portion in pocket form along the forward vertical edge of said side; and a series of separate connecting guide slips, each having two external leaves removably engaged inside two hanging folders adjacent to one another and at least one intermediate folded leaf engaged in said folded-over portion in pocket form of one of said two adjacent hanging folders.

2. A filing device as claimed in claim 1, the hanging folders consisting of comparatively flexible material; and means on said hanging folder for hanging within a filing cabinet.

3. A filing device as claimed in claim 1 and folded portions on the outwardly rear and upper marginal edges of each hanging folder for the purpose of strengthening.

4. A filing device as claimed in claim 1 and means for fastening the outwardly folded-over portions of the hanging folders to the adjacent sides of said folder.

5. A filing device as claimed in claim 1, said connecting guide slips having forwardly projecting extensions with index slip carriers for the purpose of indexing.

6. A filing device as claimed in claim 1, said connecting guide slips extending upon the whole height of said hanging folders.

7. A filing device as claimed in claim 1, said connecting guide slips extending on a fraction of the height of said hanging folders.

8. A filing device as claimed in claim 1, said connecting guide slips having forwardly projecting extensions extending on the whole height of the body of said connecting guide slips.

9. A filing device as claimed in claim 1, said connecting guide slips having forwardly projecting extensions extending on a fraction of the heights of the body of said connecting guide slips.

10. A filing device as claimed in claim 1, one of said connecting guide slips having a forwardly projecting extension and connecting the front rank of a series of said hanging folders for the purpose of indexing.

JOSEPH CHENOUARD.

REFERENCES CITED

The following references are of record in the file of this patent:

UNITED STATES PATENTS

| Number | Name | Date |
|---|---|---|
| 1,126,923 | Ulrich | Feb. 2, 1915 |

FOREIGN PATENTS

| Number | Country | Date |
|---|---|---|
| 814,544 | France | Mar. 2, 1937 |